United States Patent

Minnick et al.

[11] Patent Number: 5,919,848
[45] Date of Patent: Jul. 6, 1999

[54] MAGNETIC POLYESTER COMPOSITIONS

[75] Inventors: Larry Allen Minnick, Bristol; Thomas Joseph Pecorini, Kingsport, both of Tenn.

[73] Assignee: Eastman Chemical Company, Kingsport, Tenn.

[21] Appl. No.: 09/160,487

[22] Filed: Sep. 25, 1998

Related U.S. Application Data

[60] Provisional application No. 60/063,067, Oct. 3, 1997.

[51] Int. Cl.$^6$ ...................................................... C08K 5/51
[52] U.S. Cl. ............................ 524/128; 524/431; 524/440
[58] Field of Search ............................ 523/458; 525/438, 525/449; 524/431, 440, 128

[56] References Cited

U.S. PATENT DOCUMENTS

| | | | |
|---|---|---|---|
| 4,172,859 | 10/1979 | Epstein | 524/187 |
| 4,250,078 | 2/1981 | McFarlane et al. | 524/444 |
| 4,420,581 | 12/1983 | McFarlane et al. | 524/431 |
| 4,448,846 | 5/1984 | Chang et al. | 428/412 |
| 4,639,941 | 1/1987 | Ostapchenko | 524/449 |
| 4,684,686 | 8/1987 | Hepp | 524/440 |
| 4,689,086 | 8/1987 | Naumann et al. | 106/290 |
| 4,753,980 | 6/1988 | Deyrup | 524/449 |
| 4,882,227 | 11/1989 | Iwase et al. | 524/440 |
| 4,963,291 | 10/1990 | Bercaw | 524/431 |
| 5,001,000 | 3/1991 | Rohrbacher et al. | 428/215 |
| 5,021,495 | 6/1991 | Minnick . | |
| 5,321,060 | 6/1994 | Oliver et al. | 523/223 |
| 5,369,154 | 11/1994 | Laughner | 524/449 |
| 5,385,773 | 1/1995 | Yau et al. | 524/431 |
| 5,419,936 | 5/1995 | Tindale | 524/440 |
| 5,648,013 | 7/1997 | Uchida et al. | 524/431 |

FOREIGN PATENT DOCUMENTS

| | | | |
|---|---|---|---|
| 54-68856 | 6/1979 | Japan | 524/440 |
| 57-14643 | 1/1982 | Japan | 524/440 |
| 60-35321 | 2/1985 | Japan | 524/431 |
| 60-208374 | 10/1985 | Japan | 524/440 |
| 2-281070 | 11/1990 | Japan | 524/431 |
| 4-114057 | 4/1992 | Japan | 524/431 |
| 5-25371 | 2/1993 | Japan | 524/431 |

*Primary Examiner*—Veronica P. Hoke
*Attorney, Agent, or Firm*—Betty J. Boshears; Harry J. Gwinnell

[57] ABSTRACT

Disclosed are magnetic polyester compositions comprising a thermoplastic polyester polymer, certain epoxy-containing ethylene polymers, an aromatic phosphite compound, and elemental or magnetite iron.

7 Claims, No Drawings

MAGNETIC POLYESTER COMPOSITIONS

CROSS REFERENCE TO RELATED APPLICATIONS

This application claims priority upon provisional application Ser. No. 60/063,067 filed Oct. 3, 1997, and the application Ser. No. 60/063,067 application is herein incorporated by this reference in its entirety.

FIELD OF THE INVENTION

This invention relates to certain novel magnetic polyester compositions comprising a thermoplastic polyester polymer, certain epoxy-containing ethylene polymers, an aromatic phosphite compound, and elemental or magnetite iron.

SUMMARY OF THE INVENTION

The novel, thermoplastic, magnetic polyester compositions provided by the present invention comprise:

I. about 39.5 to about 72.9 weight percent of a thermoplastic polyester comprised of:
  (A) diacid residues comprising at least 50 mole percent terephthalic acid residues; and
  (B) diol residues comprising at least 50 mole percent residues derived from ethylene glycol, 1,4-cyclohexanedimethanol or a mixture thereof;

II. about 2 to about 10 weight percent of one or more epoxy-containing ethylene polymers having the formula X/Y/Z wherein:

X represents ethylene residues which comprise about 50 to 95 weight percent of polymer X/Y/Z;

Y represents residues derived from vinyl acetate or a compound having the formula:

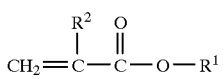

wherein $R^1$ is an alkyl or cycloalkyl group containing of up to about 12 carbon atoms or a phenyl or alkylphenyl group, the alkyl portion of which contains up to about 12 carbon atoms; and $R^2$ is hydrogen, methyl or ethyl, preferably hydrogen; and Y constitutes about 4 to 35 weight percent, preferably 15 to 30 weight percent of polymer E/X/Y; and Z represents residues or monomeric units derived from a monomer containing an epoxy group selected from the group consisting of glycidyl acrylate and glycidyl methacrylate and Z constitutes about 1 to 15 weight percent, preferably about 1 to 10 weight percent, of polymer X/Y/Z;

III. about 0.1 to about 0.5 weight percent of one or more aromatic phosphite compounds; and IV. about 25 to about 50 weight percent of an iron component selected from the group consisting of $Fe_3O_4$ iron oxide and elemental iron; and wherein polyester component I is based on 100 mole percent diacid residues and 100 mole percent diol residues and the weight percentages of each of components I, II, III and IV are based on the total weight of components I, II, III and IV.

It is unexpected that the polyester compositions of the present invention have the toughness properties or tensile elongation at break due to the elevated amounts of filler or iron oxide present to enhance magnetic properties. These polyester compositions are useful for forming sheet products by extrusion processes. These sheet products are useful in applications requiring a response or attraction in a magnetic field.

DETAILED DESCRIPTION OF THE INVENTION

The diacid residues of polyester component I comprise at least 50 mole percent terephthalic acid residues. The diacid component may comprise up to about 50 mole percent of residues one or more diacids other than terephthalic acid such as aromatic dicarboxylic acids preferably having 8 to 14 carbon atoms, aliphatic dicarboxylic acids preferably having 4 to 12 carbon atoms, or cycloaliphatic dicarboxylic acids preferably having 8 to 12 carbon atoms. Examples of such dicarboxylic acids include phthalic acid, isophthalic acid, naphthalene-2,6-dicarboxylic acid, cyclohexanedicarboxylic acid, cyclohexanediacetic acid, diphenyl4,4'-dicarboxylic acid, succinic acid, glutaric acid, adipic acid, azelaic acid, sebacic acid, and the like. Polyesters component I may be prepared from two or more of the above dicarboxylic acids. The diacid residues of polyester component I may be derived from the dicarboxylic acid, esters and acid chlorides thereof and, in some cases, anhydrides of dicarboxylic acids.

The diol residues of polyester component I comprise at least 50 mole percent residues derived from ethylene glycol, 1,4-cyclohexane-dimethanol or a mixture thereof. The diol component may comprise up to about 50 mole percent of residues one or more other diols such as cycloaliphatic diols preferably having 6 to 20 carbon atoms or aliphatic diols preferably having 3 to 20 carbon atoms. Examples of such other diols include diethylene glycol, triethylene glycol, propane-1,3-diol, butane-1,4-diol, pentane-1,5-diol, hexane-1,6-diol, 3-methylpentanediol-(2,4), 2-methylpentanediol-(1,4),2,2,4-trimethylpentane-diol-(1,3), 2-ethyihexane-diol-(1,3), 2,2-diethylpropane-1,3-diol, 1,3-hexanediol, 1,4bis(2-hydroxy-ethoxy)benzene, 2,2-bis(4-hydroxycyclohexyl)propane, 1,1,3,3-tetramethyl-2,4-cyclobutanediol, 2,2-bis-(3-hydroxyethoxyphenyl)-propane, and 2,2-bis(4-hydroxypropoxyphenyl)propane. Polyester component I may be prepared from two or more of the above diols.

A preferred polyester component comprises PCT polyester wherein the diacid (dicarboxylic acid) residues either consist of 100 mole percent terephthalic acid residues or the dicarboxylic acid residues consist of about 65 mole percent terephthalic acid residues and about 35 mole percent isophthalic acid residues. Preferably, the diol residues consist of 100 mole percent 1,4-cyclohexanedimethanol residues. Another preferred polyester component comprises PET polyester wherein the diacid residues consist of 100 mole percent terephthalic acid residues and the diol residues consist of about 96 to 100 mole percent ethylene glycol residues and 0 to 4 mole percent 1,4-cyclohexanedimethanol residues. The polyester component also may contain small amounts, e.g., up to about 1 mole percent, of residues of trifunctional or tetrafunctional comonomers such as trimellitic anhydride, trimethylolpropane, pyromellitic dianhydride, pentaerythritol, and other polyester-forming polyacids or polyols generally known in the art.

The polyesters useful in the practice of this invention may have a relatively broad molecular weight range, e.g., an inherent viscosity in the range of about 0.4 to 1.2 dL/g when measured at a temperature of 25° C. for a 0.5 gram sample in 100 mL of a 60/40 by weight solution of phenol/tetrachloroethane. Polyesters having an inherent viscosity in the range of about 0.5 to 1.0 dL/g are preferred.

The polyesters which can be utilized as polyester component I are commercially available and/or can be prepared by conventional polycondensation procedures well-known in the art. Such processes include direct condensation of the dicarboxylic acid(s) with the diol(s) or by ester interchange using dialkyl dicarboxylates. For example, a dialkyl terephthalate such as dimethyl terephthalate is ester interchanged with the diol(s) at elevated temperatures in the presence of a catalyst. Depending on the degree of polymerization desired, the polyesters may also be subjected to solid state polymerization methods.

Polyester component I may be a PCT polyester containing at least 50 mole percent terephthalic acid residues and at least 98–50 mole percent 1,4-cyclohexanedimethanol. The PCT polymer optionally may be modified with up to 50 mole percent of one or more different dicarboxylic acids other than terephthalic acid. Examples of such different dicarboxylic acids are set forth above. In addition, the PCT polyester may be modified with 2 to 50 mole percent of one or more different diols other than 1,4-cyclohexanedimethanol. Such additional diols include cycloaliphatic diols preferably having 6 to 20 carbon atoms or aliphatic diols preferably having 2 to 20 carbon atoms. Examples of such diols to be included with 1,4-cyclohexanedimethanol are: ethylene glycol, diethylene glycol, triethylene glycol, propane-1,3-diol, butane-1,4-diol, pentane-1,5-diol, hexane-1,6-diol, 3-methylpentanediol-(2,4), 2-methylpentanediol-(1,4),2,2,4-trimethyl-pentane-diol-(1,3), 2-ethylhexanediol-(1,3), 2,2-diethylpropane-diol-(1,3), hexanediol-(1,3), 1,4-di-(hydroxyethoxy)-benzene, 2,2-bis-(4-hydroxycyclo-hexyl)propane, 2,4-dihydroxy-1,1,3,3-tetramethyl-cyclobutane, 2,2-bis-(3-hydroxyethoxyphenyl)-propane, and 2,2-bis(4-hydroxypropoxyphenyl)-propane. The dicarboxylic acid portion of the PCT polyesters preferably consists either of 100 mole percent terephthalic acid residues or the dicarboxylic acid portion consists of 65 mole percent terephthalic acid residues and 35 mole percent isophthalic acid residues. Preferably, the diol portion consists of 100 mole percent 1,4-cyclohexanedimethanol residues.

Alternatively, polyester component I may be a PET polymer containing at least 90 mole percent terephthalic acid residues and at least 98–50 mole percent ethylene glycol residues. The PET polymer optionally may be modified with up to 10 mole percent of one or more different dicarboxylic acids other than terephthalic acid. Examples of such different dicarboxylic acids are set forth above. In addition, the PET polymer optionally may be modified with up to about 2 to 50 mole percent, of one or more different diols other than ethylene glycol. Such additional diols include cycloaliphatic diols preferably having 6 to 20 carbon atoms or aliphatic diols preferably having 3 to 20 carbon atoms. Examples of such diols to be included with ethylene glycol are: diethylene glycol, triethylene glycol, 1,4-cyclohexanedimethanol, propane-1,3-diol, butane-1,4-diol, pentane-1,5-diol, hexane-1,6-diol, 3-methylpentanediol-(2,4), 2-methyl-pentanediol-(1,4), 2,2,4-trimethylpentane-diol-(1,3), 2-ethylhexanediol-(1,3), 2,2-diethylpropane-diol-(1,3), hexanediol-(1,3), 1,4-di-(hydroxyethoxy)-benzene, 2,2-bis-(4-hydroxycyclohexyl)-propane, 2,4-dihydroxy-1,1,3,3-tetramethyl-cyclobutane, 2,2-bis-(3-hydroxyethoxyphenyl) propane, and 2,2-bis-(4-hydroxypropoxyphenyl)propane, 1,4-Cyclohexanedimethanol is preferred.

The epoxy-containing ethylene polymers constituting component II suitable for use in the present invention have the general formula:

X/Y/Z

Wherein X is a monomeric unit or residue formed from ethylene and preferably is present in the polymer in a range of from about 50 to about 95 weight percent. Preferably, X is present in the copolymer in a range of from about 60 to about 84 weight percent. Y is a monomer unit or residue formed or derived from vinyl acetate or a monomer having the structure:

wherein $R^1$ is an alkyl or cycloalkyl group containing from about 1 to about 12 carbon atoms and preferably from about 1 to about 6 carbon atoms. $R^1$ most preferably is an ethyl group or a methyl group. $R^1$ also can be a phenyl or an alkylphenyl group, the alkyl portion of which contains from about 1 to about 12 carbon atoms, and preferably from about 1 to about 6 carbon atoms. $R^2$ may be hydrogen, methyl or ethyl, and preferably is hydrogen. Y is most preferably represents acrylate or vinyl acetate. Y is present in the polymer in a range of from about 4 to about 35 weight percent, and preferably is present in the polymer in a range of from about 15 to about 30 weight percent.

Z is a monomeric unit or residue containing an epoxy group and is selected form monomers such as glycidyl acrylate and a glycidyl methacrylate. Z preferably is glycidyl methacrylate. Z is present in the polymer in a range of from about 1 to about 15 weight percent, and preferably is present in the polymer in a range of from about I to about 10 weight percent.

The epoxy-containing, ethylene polymers preferably are present in the compositions of the invention in a concentration of about 2 to about 10 weight percent. This concentration of about 2 to 10 weight percent can consist of one or more epoxy-containing, ethylene polymer. The ethylene polymers containing epoxy groups suitable for use in the present invention can be prepared by well-known direct random or block copolymerization methods known by those skilled in the art. The block polymers are preferred.

The polyester compositions of the present invention also contain an aromatic phosphite. Typical aromatic phosphites include tris(2,4-di-tert-butylphenyl)phosphite sold by Ciba-Geigy under the trademark Irgafos 168, 4,4'-butylidenebis (3-methyl-64-tert-butylphenyl-di-tridecyl)phosphite sold by Adeka Argus Chemical under the trademark Mark P, tris (monononyl-phenyl)phosphite, tetrakis(2,4-di-tert-butylphenyl)4,4'-diphemylenediphosphonite, and bis(2,4-di-tert-butylphenyl)pentaerythritol diphosphite sold by GE Specialty Chemicals under the trademark ULTRANOX 626. One or more of the aromatic phosphite compounds of the invention can be used. Aromatic phosphite component III is present in the polyester compositions of the invention in a concentration of about 0.1 to 5 weight percent.

Iron component IV of the compositions of this invention is selected from the group consisting of $Fe_3O_4$ iron oxide (magnetite iron oxide) and elemental (reduced) iron. Iron component IV preferably constitutes about 25 to about 50 weight percent, preferably about 30 to about 45 weight percent of the polyester compositions. As a result of the incorporation of elemental iron or $Fe_3O_4$ iron oxide (magnetite iron oxide), these polyester compositions exhibit an attraction to a magnetic field.

This invention can be further illustrated by the following examples of preferred embodiments thereof, although it will be understood that these examples are included merely for purposes of illustration and are not intended to limit the scope of the invention unless otherwise specifically indicated.

EXAMPLE

A composition consisting of 67.26 weight percent poly (ethylene terephthalate), 30 weight percent $Fe_3O_4$ iron oxide, 2.5 weight percent ethylene/methyl acrylate/glycidyl methacrylate copolymer, 0.15% bis(2,4-di-tert-butylphenyl) pentaerythritol diphosphite, and 0.09% calcium stearate (release compound) was prepared by extrusion compounding using a twin screw extruder. The resulting composition can be formed into tough sheet containing fastening hooks utilized in traditional hook/loop fastening technology. The resulting sheet/hook product will exhibit an attraction in a magnetic field. This sheet/hook product can be produced using sheet extrusion processes.

I claim:

1. A thermoplastic, magnetic polyester composition comprising:
   I. about 39.5 to about 72.9 weight percent of a thermoplastic polyester comprised of:
      (A) diacid residues comprising at least 50 mole percent terephthalic acid residues; and
      (B) diol residues comprising at least 50 mole percent residues derived from ethylene glycol, 1,4-cyclohexanedimethanol or a mixture thereof;
   II. about 2 to about 10 weight percent of one or more epoxy-containing ethylene polymers having the formula X/Y/Z wherein:
      X represents ethylene residues which comprise about 50 to 95 weight percent of polymer X/Y/Z;
      Y represents residues derived from vinyl acetate or a compound having the formula:

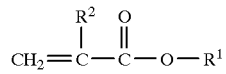

wherein $R^1$ is an alkyl or cycloalkyl group containing of up to about 12 carbon atoms or a phenyl or alkylphenyl group, the alkyl portion of which contains up to about 12 carbon atoms; and $R^2$ is hydrogen, methyl or ethyl; and Y constitutes about 4 to 35 weight percent of polymer E/X/Y; and
      Z represents residues derived from a monomer containing an epoxy group selected from the group consisting of glycidyl acrylate and glycidyl methacrylate and Z constitutes about 1 to 15 weight percent of polymer X/Y/Z;
   III. about 0.1 to about 0.5 weight percent of one or more aromatic phosphite compounds; and
   IV. about 25 to about 50 weight percent of an iron component selected from the group consisting of $Fe_3O_4$ iron oxide and elemental iron;
wherein polyester component I is based on 100 mole percent diacid residues and 100 mole percent diol residues and the weight percentages of each of components I, II, III and IV are based on the total weight of components I, II, III and IV.

2. A composition according to claim 1 wherein polyester component I has an inherent viscosity of about 0.5 to 1.0 dL/g when measured at a temperature of 25° C. for a 0.5 gram sample in 100 mL of a 60/40 by weight solution of phenol/tetrachloroethane.

3. A composition according to claim 2 wherein component II has the formula X/Y/Z wherein:
   X represents ethylene residues which comprise about 60 to 84 weight percent of polymer X/Y/Z;
   Y represents residues derived from vinyl acetate or a compound having the formula:

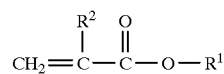

wherein $R^1$ is an alkyl group containing of 1 to about 6 carbon atoms; and $R^2$ is hydrogen, methyl or ethyl; and Y constitutes about 15 to 30 weight percent of polymer E/X/Y; and
   Z represents residues derived from a monomer containing an epoxy group selected from the group consisting of glycidyl acrylate and glycidyl methacrylate and Z constitutes about 1 to 10 weight percent of polymer X/Y/Z.

4. A thermoplastic, magnetic polyester composition according to claim 1 comprising:
   I. about 39.5 to about 72.9 weight percent of a thermoplastic polyester having an inherent viscosity of about 0.5 to 1.0 dL/g when measured at a temperature of 25° C. for a 0.5 gram sample in 100 mL of a 60/40 by weight solution of phenol/tetra-chloroethane comprised of:
      (A) diacid residues consisting of 100 mole percent terephthalic acid residues or about 65 mole percent terephthalic acid residues and about 35 mole percent isophthalic acid residues; and
      (B) diol residues comprising at least 50 mole percent residues derived from ethylene glycol, 1,4-cyclohexanedimethanol or a mixture thereof;
   II. about 2 to 10 weight percent of one or more epoxy-containing ethylene polymers having the formula X/Y/Z wherein:
      X represents ethylene residues which comprise about 60 to 84 weight percent of polymer X/Y/Z;
      Y represents residues derived from a compound having the formula:

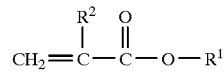

wherein $R^1$ is an alkyl group containing of 1 to about 6 carbon atoms; and $R^2$ is hydrogen, methyl or ethyl; and Y constitutes about 15 to 30 weight percent of polymer E/X/Y; and
      Z represents residues derived from a monomer containing an epoxy group selected from the group consisting of glycidyl acrylate and glycidyl methacrylate and Z constitutes about 1 to 10 weight percent of polymer X/Y/Z.

5. A composition according to claim 4 wherein the diol residues of the thermoplastic polyester consist of 100 mole percent 1,4-cyclohexanedimethanol residues; Y is methyl or ethyl; and component III is selected from tris(2,4-di-tert-butylphenyl)phosphite, 4,4'-butylidenebis(3-methyl-6-tert-butylphenyl-di-tridecyl)phosphite, tris(monononylphenyl)phosphite, tetrakis(2,4-di-tert-butylphenyl)4,4'-diphenylenediphosphonite, and bis(2,4-di-tert-butylphenyl) pentaerythritol diphosphite.

6. A thermoplastic, magnetic polyester composition according to claim 1 comprising:
   I. about 39.5 to about 72.9 weight percent of a thermoplastic polyester having an inherent viscosity of about 0.5 to 1.0 dL/g when measured at a temperature of 25° C. for a 0.5 gram sample in 100 mL of a 60/40 by weight solution of phenol/tetra-chloroethane comprised of:

(A) diacid residues consisting of 100 mole percent terephthalic acid residues; and
(B) diol residues consisting of about 96 to 100 mole percent ethylene glycol resdiues and 0 to about 4 mole percent 1,4-cyclohexanedimethanol residues;

II. about 2 to 10 weight percent of one or more epoxy-containing ethylene polymers having the formula X/Y/Z wherein:

X represents ethylene residues which comprise about 60 to 84 weight percent of polymer X/Y/Z;

Y represents residues derived from a compound having the formula:

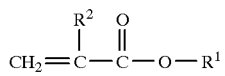

wherein $R^1$ is an alkyl group containing of 1 to about 6 carbon atoms; and $R^2$ is hydrogen, methyl or ethyl; and Y constitutes about 15 to 30 weight percent of polymer E/X/Y; and Z represents residues derived from a monomer containing an epoxy group selected from the group consisting of glycidyl acrylate and glycidyl methacrylate and Z constitutes about 1 to 10 weight percent of polymer X/Y/Z.

7. A composition according to claim 6 wherein Y is methyl or ethyl; and component III is selected from tris(2,4-di-tert-butylphenyl)phosphite, 4,4'-butylidenebis(3-methyl-6-tert-butylphenyl-di-tridecyl)phosphite, tris(monononylphenyl)phosphite, tetrakis(2,4-di-tert-butylphenyl)4,4'-diphenylenediphasphonite, and bis(2,4-di-tert-butylphenyl)-pentaerythritol diphosphite.

* * * * *